United States Patent [19]
Moskovich

[11] Patent Number: 4,758,073
[45] Date of Patent: * Jul. 19, 1988

[54] ZOOM LENS

[75] Inventor: Jacob Moskovich, Cincinnati, Ohio

[73] Assignee: Vivitar Corporation, Santa Monica, Calif.

[*] Notice: The portion of the term of this patent subsequent to Jul. 31, 2001 has been disclaimed.

[21] Appl. No.: 597,180

[22] Filed: Apr. 5, 1984

Related U.S. Application Data

[63] Continuation-in-part of Ser. No. 189,591, Oct. 1, 1980, Pat. No. 4,462,664, which is a continuation-in-part of Ser. No. 082,010, Oct. 5, 1979, abandoned.

[51] Int. Cl.$^4$ ............................................... G02B 15/18
[52] U.S. Cl. .................................................. 350/427
[58] Field of Search ...................... 350/423, 427, 475

[56] References Cited

U.S. PATENT DOCUMENTS

| | | | |
|---|---|---|---|
| 4,307,943 | 12/1981 | Betensky et al. | 350/428 |
| 4,331,389 | 5/1982 | Ogawa et al. | 350/427 |
| 4,462,664 | 7/1984 | Moskovich | 350/427 |
| 4,504,125 | 3/1985 | Fujii | 350/427 |

Primary Examiner—John K. Corbin
Assistant Examiner—P. M. Dzierzynski
Attorney, Agent, or Firm—Costas & Montgomery

[57] ABSTRACT

A zoom lens having a range of equivalent focal lengths (EFL) which extend from a dimension above the diagonal of the film plane of the lens to a telephoto focal length, where the lens comprises three groups of which two are movable to vary the EFL.

12 Claims, 4 Drawing Sheets

ZOOM LENS

RELATED APPLICATIONS

This application is a continuation-in-part of application Ser. No. 189,591 filed Oct. 1, 1980, now U.S. Pat. No. 4,462,664, which was a continuation-in-part of application Ser. No. 082,010 filed Oct. 5, 1979, now abandoned.

FIELD OF THE INVENTION

This invention relates to zoom lenses and, more particularly, relates to telephoto zoom lenses having a capability of very close focusing.

BACKGROUND OF THE INVENTION

Conventional telephoto zoom lenses are generally configured in four groups which are plus-minus-minus-plus or plus-minus-plus-plus and usually have a fixed aperture stop in the rear positive group which is also fixed in relation to the image planes. In these types of lenses, the size of the front group and therefore, the maximum diameter of the lens, is determined by the size of the entrance pupil at the long end of the zoom lens range. This requires that the smallest diameter the front group may have is the diameter of the entrance pupil at the long end of the range. Often, the diameter of the front group should be larger than that of the entrance pupil to satisfy relative illumination requirements at the edges of the images format. Therefore, if the lens is required to have a large relative aperture, the diameter of the front group is large, making the lens impractical and expensive for the high volume consumer market. Additionally, the large barrel diameter may be found objectionable by the user.

More modern forms of telephoto zoom lenses have the aperture stop and/or the rear group both moving during a zooming operation. These configurations usually result in a smaller physical size of the lens since the lens then has a variable relative aperture number. With the variable aperture, the lens is usually slower at the longer equivalent focal length (EFL), resulting in a smaller entrance pupil at that end. These forms of lenses generally require a more elaborate motion of the groups that move with zooming, with the front group possibly moving for both zooming and focusing. As a result, the mechanical configuration of the lens becomes more complicated than that of the conventional forms, and the lens more difficult to manufacture.

The conventional approach to the design of a zoom lens is to minimize lens group powers and maximize zooming group travel. That, in turn, means that the centration and the tilt tolerances have to be controlled quite accurately over relatively long travel distances. And since the motion of every zoom group is represented by a quadratic function, the long travel can often require zoom cams which must change the acceleration and the direction of motion of zooming groups. This may often result in designs which are difficult or simply impossible to physically realize.

The present lens provides a three group zoom lens of a plus-minus-plus configuration, wherein the front positive group is stationary with zooming and moves only for focusing, and the second negative group and the third positive group move in opposite directions relative to each other for zooming.

SUMMARY OF THE INVENTION

A lens embodying the invention comprises three groups, a first positive group which moves only for focusing; a second negative group; and a third positive group where the second negative group and the third positive group move in opposite direction relative to each other for zooming. As suggested by U.S. Pat. No. 4,307,943, the front group power is kept very strong. This permits a simple short focusing travel by the first group while focusing to magnification of 1:2 or closer. Since the focusing group is of relatively strong power, the first zooming group that is the second negative group is of also strong negative optical power. Consequently, it must travel only a short distance for zooming. The third group is a telephoto type lens, and it comprises two subgroups separated by a large airspace. The front or object side subgroup contains most of the power of the third group in order to keep the principal points of that group as close as possible to the front of the lens. The rear subgroup is of low optical power and may comprise as little as one element.

Having both of the zooming groups of strong powers allows their motion to be represented by shorter and smoother portions of the quadratic function. Consequently, zoom cams are smoother, and the centration and tilt tolerances of zooming groups can be better controlled in manufacturing, allowing for higher production yields.

The smooth, monotonic motion of both zooming groups also allows the weight and travel of the zoom groups to be balanced in such a way as to eliminate "zoom creep".

An object of this invention is to provide a new and improved telephoto zoom lens which is compact and which may be focused close to a magnification of 1:2.

Another object of this invention is to provide a new and improved compact telephoto zoom lens.

A further object of this invention is to provide a new and improved telephoto zoom lens which is relatively compact, has a large relative aperture, particularly at the shorter end of its EFL range, and which may be focused very close to an object to provide a magnification of approximately 1:2.

The features of the invention which are believed to be novel are particularly pointed out and distinctly claimed in the concluding portion of this specification. The invention, however, together with further objects and advantages thereof, may best be appreciated by reference to the following detailed description taken in contunction with the drawings.

DETAILED DESCRIPTION OF THE ILLUSTRATED EMBODIMENTS

Figure 1:
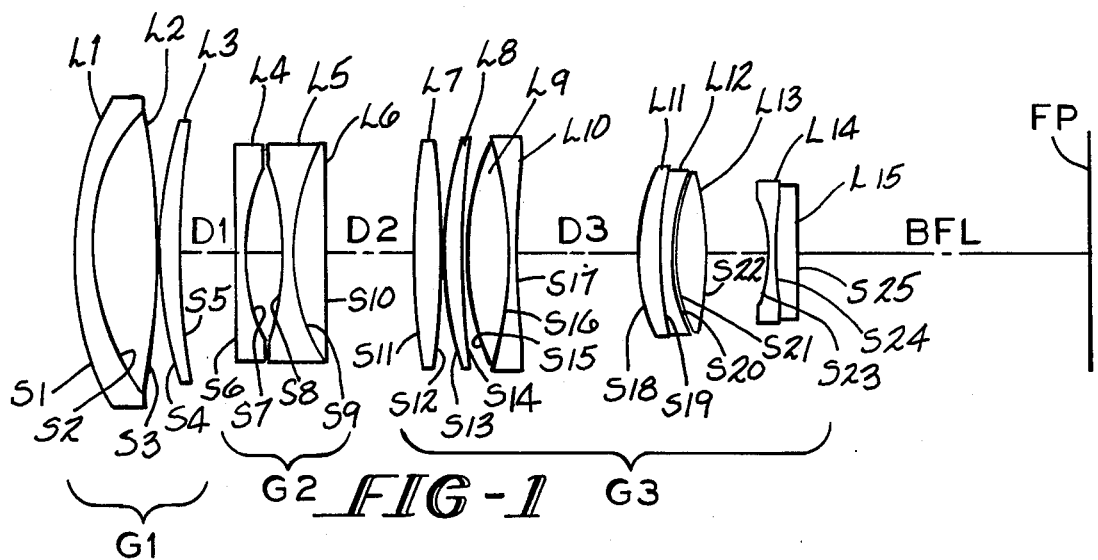
FIGS. 1–8 are schematic side elevations of lenses embodying the invention.

A lens embodying the invention comprises three optical groupings: G1, G2, and G3, as shown in the drawings. In the drawings, the reference G followed by an Arabic numeral designates a lens group. Individual lens elements are designated by the reference L followed by an Arabic numeral, and lens surfaces are designated by the letter S followed by an Arabic numeral. In all cases, the group lens elements and lens surfaces are numbered progressively from the object end to the image end of the lens.

In all examples, group G1 is positive, group G2 is negative, and group G3 is positive. Group G1 is preferably stationary during zooming and moves only for focusing, while the second negative group, G1, and the third positive group, G3, move in opposite directions to each other to accomplish change in the EFL.

In order to maintain a short focusing travel of the first group while focusing to a magnification of 1:2 or closer, the focal length of the first group, G1, is kept shorter than the shortest EFL of the overall range. This may be expressed as:

$$F_1 < F_s$$

where $F_1$ is the EFL of group G1 and $F_s$ is the shortest EFL of the lens.

Otherwise stated, the optical power of the first group is greater than the optical power of the overall lens at its shortest EFL.

Since the focusing group is of strong optical power, the first zooming group, G2, is also of strong optical power, but negative. Therefore, it requires only a short zooming motion to accomplish a magnification change between the shortest EFL and the longest EFL of the lens.

The ratio of focal lengths of the first and the second groups should satisfy the following relationship:

$$2.0 < |F_1/F_2| < 2.85$$

If the upper limit of this relationship is exceeded, then the distortion and the spherical aberration introduced by the negative zooming group becomes extremely difficult to correct with limited degrees of freedom available in the following second zooming group. If the lower limit of the above relationship is not satisfied, then the amounmt of travel of the first zooming group becomes too large for the requirements of compactness to be met.

The focal length of the third positive group is chosen to satisfy the following relationship:

$$1.0 F_1 < F_3 < 1.85 F_1$$

If the EFL $F_3$ of the third group, G3, is lower than the lower limit of the immediate preceding relationship, it becomes very difficult to correct aberrations, particularly spherical aberrations and distortion introduced by very strong first and second groups. If the EFL $F_3$ of the third group, G3, is greater than the upper limit of the foregoing relationship, the total travel of the third group during zooming and the size of the overall lens becomes large and may be unacceptable.

Figure 6:
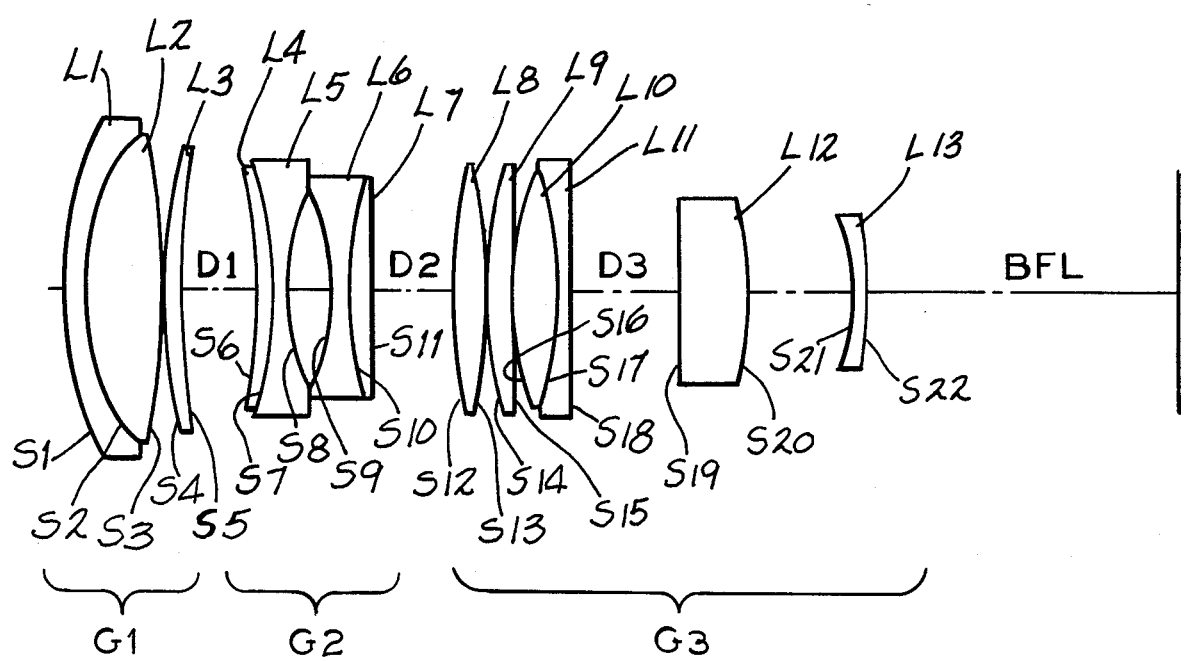

The third group is divided into two subgroups, G3a and G3b, separated by a wide airspace, D3. The front subgroup has the majority of the power of the third group to keep the principal points of that group as close as possible to the front. The rear subgroup has low optical power and may comprise only one element, as shown in FIG. 6.

Lenses embodying the invention consisting of three lens groups have group powers in a ratio to the geometric means of the power of the lens, as set forth in Table VIII hereto. A lens embodying the invention has the following powers:

$$2.2 > K_1/K_M > 1.4$$

$$4.8 > |K_2/K_M| > 3.4$$

$$2.9 > K_3/K_M > 2.3$$

where $$K_M = \sqrt{K_S K_L}$$

and $K_S$ is the power of the lens at the shortest EFL thereof, $K_L$ is the power of the lens at the longest EFL thereof and $K_1$, $K_2$ and $K_3$ are the optical powers of said first, second and third groups, respectively.

In the following tables, lenses embodying the invention as scaled to an image frame of 24×36 mm are set forth. In the tables, lens elements are designated by L followed by an Arabic numeral progressively from the object to image end. Positive radii are struck from the right and negative radii are struck from the left on the optical axis. Lens surfaces are designated by S followed by an Arabic numeral progressively from the object to the image end. The index of refraction of each lens element is given as $N_D$ and the dispersion as measured by the Abbe Number by $V_D$. The spacing of groups G2 at various zoom positions from Group G1 is given as D1 and the spacing of group G2 from Group G3 is given as D2. The back focal length of the lens (BFL) is the distance from the rear surface of the last lens element on the optical axis to the film plane FP which coincides with the intended image plane of the camera. The spacing of the subgroups of the third group is given by D3.

A lens embodying the invention may have one or more surfaces which are aspheric and defined by the equation $$X = \frac{Cy^2}{1 + \sqrt{1 - (1 + K) C^2 y^2}} + Dy^4 + Ey^6 + Fy^8 + Gy^{10}$$

where X is the surface at a semi-aperture distance y from the optical axis of the lens, C is the curvature of the surface at the optical axis equal to the reciprocal of the radius, K is a conic constant or other surface of revolution, and D, E, F, and G are constants.

Table I defines a lens embodying the invention as shown in FIG. 1.

TABLE I

| LENS | SURFACE | SURFACE RADII (mm) | AXIAL DISTANCE BETWEEN SURFACES (mm) | $N_D$ | $V_D$ |
|---|---|---|---|---|---|
| L1 | S1 | 57.79 | | | |
| | | | 3.00 | 1.805 | 25.5 |
| L2 | S2 | 36.55 | | | |
| | | | 12.20 | 1.564 | 60.8 |
| | S3 | −203.97 | | | |
| | | | .10 | | |
| L3 | S4 | 73.11 | | | |
| | | | 4.00 | 1.658 | 50.9 |
| | S5 | 147.31 | | | |
| | | | D1 | | |
| L4 | S6 | 5646.19 | | | |
| | | | 2.00 | 1.773 | 49.6 |
| | S7 | 39.02 | | | |
| | | | 6.20 | | |
| | S8 | −44.79 | | | |
| L5 | | | 2.00 | 1.713 | 53.9 |
| | S9 | 36.71 | | | |
| L6 | | | 6.00 | 1.805 | 25.5 |
| | S10 | 1391.85 | | | |
| | | | D2 | | |
| | S11 | 118.44 | | | |

TABLE I-continued

| LENS | | SURFACE RADII (mm) | AXIAL DISTANCE BETWEEN SURFACES (mm) | $N_D$ | $V_D$ |
|---|---|---|---|---|---|
| L7 | | | 5.00 | 1.487 | 70.4 |
| | S12 | −202.53 | | | |
| | | | .10 | | |
| | S13 | 66.67 | | | |
| L8 | | | 4.00 | 1.702 | 41.2 |
| | S14 | 228.83 | | | |
| | | | .10 | | |
| | S15 | 45.89 | | | |
| L9 | | | 8.00 | 1.487 | 70.4 |
| | S16 | −73.04 | | | |
| L10 | | | 1.50 | 1.785 | 26.1 |
| | S17 | 180.77 | | | |
| | | | 23.51 | | |
| | S18 | 37.07 | | | |
| L11 | | | 4.00 | 1.487 | 70.4 |
| | S19 | 73.88 | | | |
| L12 | | | 1.80 | 1.575 | 41.5 |
| | S20 | 31.01 | | | |
| | | | 1.20 | | |
| | S21 | 49.17 | | | |
| L13 | | | 5.00 | 1.517 | 52.2 |
| | S22 | −58.36 | | | |
| | | | 11.66 | | |
| | S23 | −27.51 | | | |
| L14 | | | 1.80 | 1.773 | 49.6 |
| | S24 | 438.24 | | | |
| | | | .10 | | |
| | S25 | 120.08 | | | |
| L15 | | | 3.50 | 1.805 | 25.5 |
| | S26 | −377.00 | | | |

Relative Aperture = 2.86–4.14
Aperture 3.43 mm after surface S17
EFL 74.04–196.26 mm

ZOOM SPACING DATA

| EFL | D1 | D2 | BFL |
|---|---|---|---|
| 74.0 | 3.67 mm | 39.19 mm | 39.03 mm |
| 133.57 | 10.24 | 16.31 | 54.56 |
| 196.26 | 13.86 | .50 | 64.44 |

Figure 2:
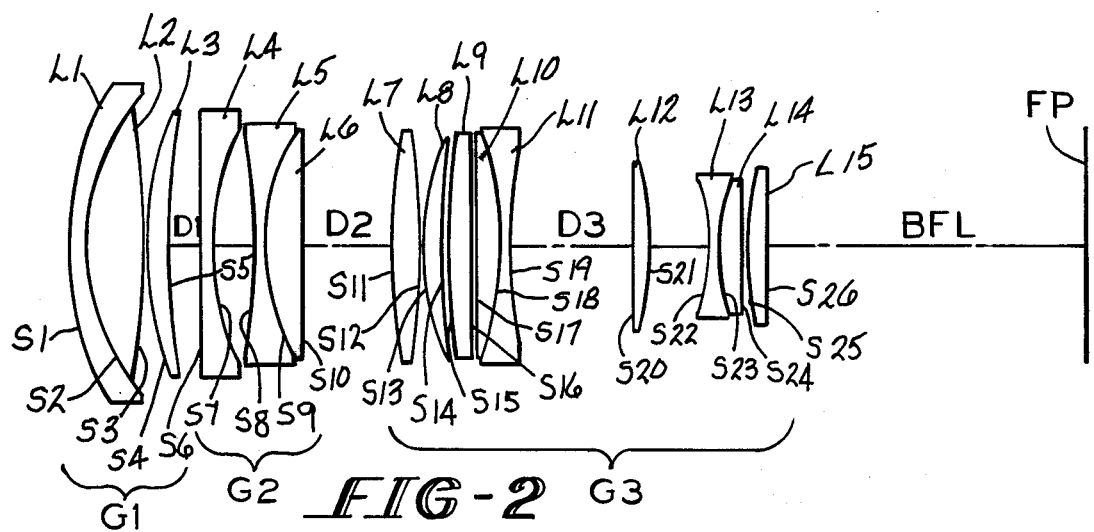

Table II defines a lens embodying the invention as shown in FIG. 2:

TABLE II

| LENS | | SURFACE RADII (mm) | AXIAL DISTANCE BETWEEN SURFACES (mm) | $N_D$ | $V_D$ |
|---|---|---|---|---|---|
| | S1 | 57.13 | | | |
| L1 | | | 3.00 | 1.805 | 25.5 |
| | S1 | 38.71 | | | |
| L2 | | | 11.00 | 1.511 | 60.5 |
| | S3 | −206.5 | | | |
| | | | .20 | | |
| | S4 | 66.63 | | | |
| L3 | | | 4.00 | 1.511 | 60.5 |
| | S5 | 236.48 | | | |
| | | | D1 | | |
| | S6 | −1808.22 | | | |
| L4 | | | 2.20 | 1.773 | 49.5 |
| | S7 | 42.9 | | | |
| | | | 7.00 | | |
| | S8 | −53.64 | | | |
| L5 | | | 2.00 | 1.711 | 54.2 |
| | S9 | 38.31 | | | |
| L6 | | | 6.50 | 1.805 | 25.5 |
| | S10 | 380.11 | | | |
| | | | D2 | | |
| | S11 | 117.93 | | | |
| L7 | | | 4.50 | 1.665 | 59.0 |
| | S12 | −174.33 | | | |
| | | | .10 | | |
| | S13 | 42.80 | | | |
| L8 | | | 4.50 | 1.602 | 54.0 |
| | S14 | 775.73 | | | |
| | | | .10 | | |
| | S15 | 114.46 | | | |
| L9 | | | 4.50 | 1.809 | 46.4 |
| | S16 | 644.83 | | | |
| | | | .60 | | |

TABLE II-continued

| LENS | | SURFACE RADII (mm) | AXIAL DISTANCE BETWEEN SURFACES (mm) | $N_D$ | $V_D$ |
|---|---|---|---|---|---|
| | S17 | −2850.47 | | | |
| L10 | | | 5.00 | 1.481 | 71.6 |
| | S18 | −54.13 | | | |
| L11 | | | 1.50 | 1.785 | 26.1 |
| | S19 | 92.26 | | | |
| | | | 22.86 | | |
| | S20 | 260.57 | | | |
| L12 | | | 3.00 | 1.773 | 34.1 |
| | S21 | −56.45 | | | |
| | | | 11.59 | | |
| | S22 | −28.86 | | | |
| L13 | | | 1.50 | 1.789 | 41.4 |
| | S23 | 33.20 | | | |
| L14 | | | 4.80 | 1.487 | 70.4 |
| | S24 | −166.68 | | | |
| | | | .10 | | |
| | S25 | 53.96 | | | |
| L15 | | | 3.50 | 1.785 | 25.7 |
| | S26 | 231.05 | | | |

Relative Aperture 2.8–4.1
Aperture .0034 mm after surface S21
EFL 72.1–203.5 mm

ZOOM SPACING DATA

| EFL | D1 | D2 | BFL |
|---|---|---|---|
| 72.1 | 3.45 mm | 44.07 mm | 38.60 mm |
| 135.0 | 6.07 | 17.73 | 59.15 |
| 203.5 | 10.28 | .50 | 72.15 |

Figure 3:
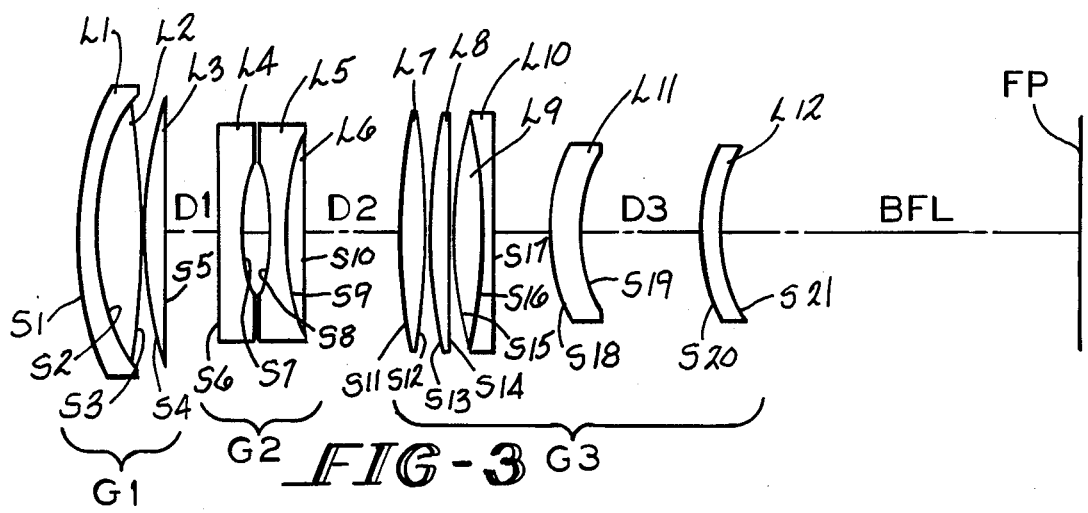

Table III defines a lens embodying the invention as shown in FIG. 3:

TABLE III

| LENS | | SURFACE RADII (mm) | AXIAL DISTANCE BETWEEN SURFACES (mm) | $N_D$ | $V_D$ |
|---|---|---|---|---|---|
| | S1 | 64.12 | | | |
| L1 | | | 3.00 | 1.805 | 25.5 |
| | S2 | 41.91 | | | |
| L2 | | | 8.20 | 1.500 | 67.1 |
| | S3 | −257.89 | | | |
| | | | .20 | | |
| | S4 | 69.28 | | | |
| L3 | | | 4.00 | 1.492 | 68.4 |
| | S5 | −1014.42 | | | |
| | | | D1 | | |
| | S6 | −368.70 | | | |
| L4 | | | 3.00 | 1.773 | 49.6 |
| | S7 | 42.37 | | | |
| | | | 4.64 | | |
| | S8 | −43.61 | | | |
| L5 | | | 2.50 | 1.660 | 58.6 |
| | S9 | 39.90 | | | |
| L6 | | | 4.00 | 1.805 | 25.5 |
| | S10 | 421.14 | | | |
| | | | D2 | | |
| | S11 | 90.55 | | | |
| L7 | | | 4.50 | 1.569 | 66.3 |
| | S12 | −220.96 | | | |
| | | | .10 | | |
| | S13 | 67.11 | | | |
| L8 | | | 4.50 | 1.635 | 58.4 |
| | S14 | 550.02 | | | |
| | | | .32 | | |
| | S15 | 55.37 | | | |
| L9 | | | 6.00 | 1.487 | 70.4 |
| | S16 | −83.00 | | | |
| L10 | | | 1.50 | 1.780 | 26.2 |
| | S17 | 626.54 | | | |
| | | | 11.14 | | |
| | S18 | 31.70 | | | |
| L11 | | | 4.42 | | |
| | S19 | 23.41 | | | |
| | | | 23.41 | | |
| | S20 | 30.82 | | | |
| L12 | | | 3.50 | 1.491 | 58.3 |
| | S21 | 34.79 | | | |

Relative Aperture 2.8–4.1
Aperture 9.64 mm after surface S17

TABLE III-continued

EFL 72.1–203.5 mm

| ZOOM SPACING DATA | | | |
|---|---|---|---|
| EFL | D1 | D2 | BFL |
| 72.1 mm | 2.26 mm | 4.17 mm | 52.38 mm |
| 135.0 | 11.68 | 17.62 | 66.49 |
| 203.5 | 15.76 | .50 | 79.55 |

Figure 4:
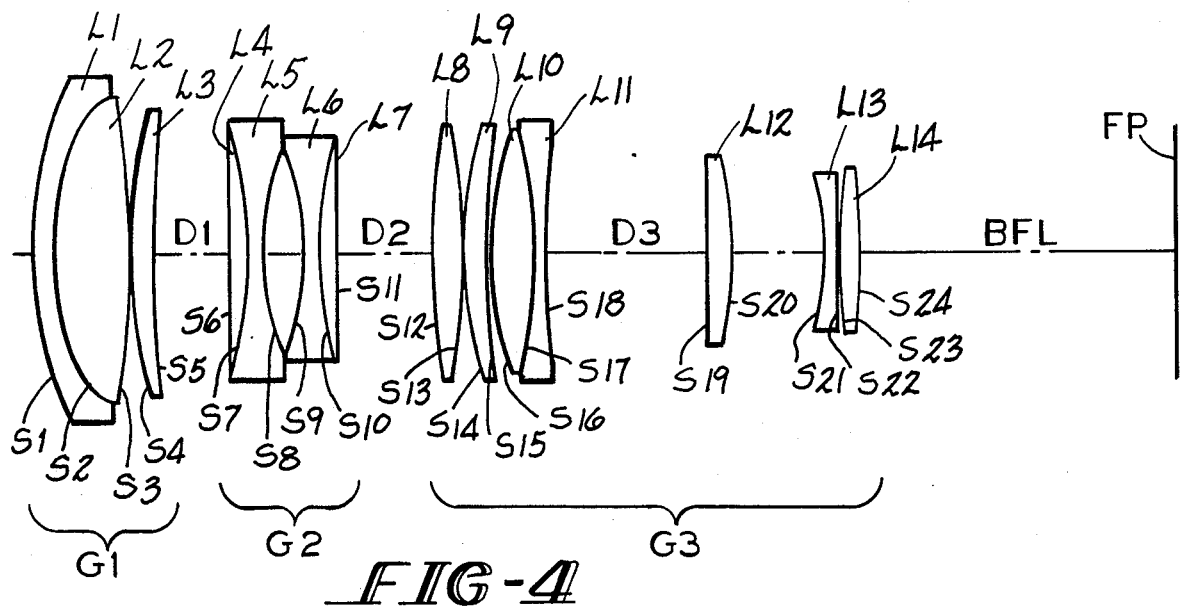

Aspheric Surface - S21
K = −.010
D = .318 × $10^{-5}$
E = −.587 × $10^{-8}$
F = .398 × $10^{-10}$
G = −.962 × $10^{-13}$ Table IV defines a lens embodying the invention as shown in FIG. 4:

TABLE IV

| LENS | | SURFACE RADII (mm) | AXIAL DISTANCE BETWEEN SURFACES (mm) | $N_D$ | $V_D$ |
|---|---|---|---|---|---|
| L1 | S1 | 58.324 | | | |
|   | S2 | 39.608 | 3.000 | 1.785 | 26.1 |
| L2 | S3 | −175.640 | 12.000 | 1.487 | 70.4 |
|   | S4 | 61.445 | .100 | | |
| L3 | S5 | 258.513 | 4.300 | 1.487 | 70.4 |
| L4 | S6 | −491.316 | D1 | | |
|   | S7 | −59.685 | 3.400 | 1.834 | 37.3 |
| L5 | S8 | 37.576 | 1.800 | 1.773 | 49.6 |
| L6 | S9 | −40.656 | 6.210 | | |
|   | S10 | 41.069 | 1.800 | 1.640 | 60.2 |
| L7 | S11 | 364.418 | 4.400 | 1.805 | 25.5 |
| L8 | S12 | 115.149 | D2 | | |
|   | S13 | −135.833 | 3.800 | 1.487 | 70.4 |
| L9 | S14 | 63.229 | .100 | | |
|   | S15 | 222.510 | 3.600 | 1.589 | 61.3 |
| L10 | S16 | 47.681 | .100 | | |
|   | S17 | −59.094 | 7.700 | 1.487 | 70.4 |
| L11 | S18 | 981.386 | 2.200 | 1.805 | 25.5 |
| L12 | S19 | 251.278 | 25.958 | | |
|   | S20 | −57.139 | 4.100 | 1.603 | 38.0 |
| L13 | S21 | −25.510 | 14.178 | | |
|   | S22 | −120.287 | 2.200 | 1.834 | 37.3 |
| L14 | S23 | 321.054 | .200 | | |
|   | S24 | −160.611 | 2.400 | 1.762 | 26.6 |

Aperture stop 6.70 mm after surface S18
Relative Aperture f/2.9–f/4.0
EFL 72.13 mm–203.79 mm

| ZOOM SPACING DATA | | | | |
|---|---|---|---|---|
| f/NO. | EFL | D1 | D2 | BFL |
| 2.89 | 72.132 mm | 2.500 mm | 3.490 | 38.997 |
| 3.49 | 134.911 | 10.692 | 15.947 | 52.352 |
| 4.01 | 203.786 | 14.468 | .500 | 64.025 |

Figure 5:
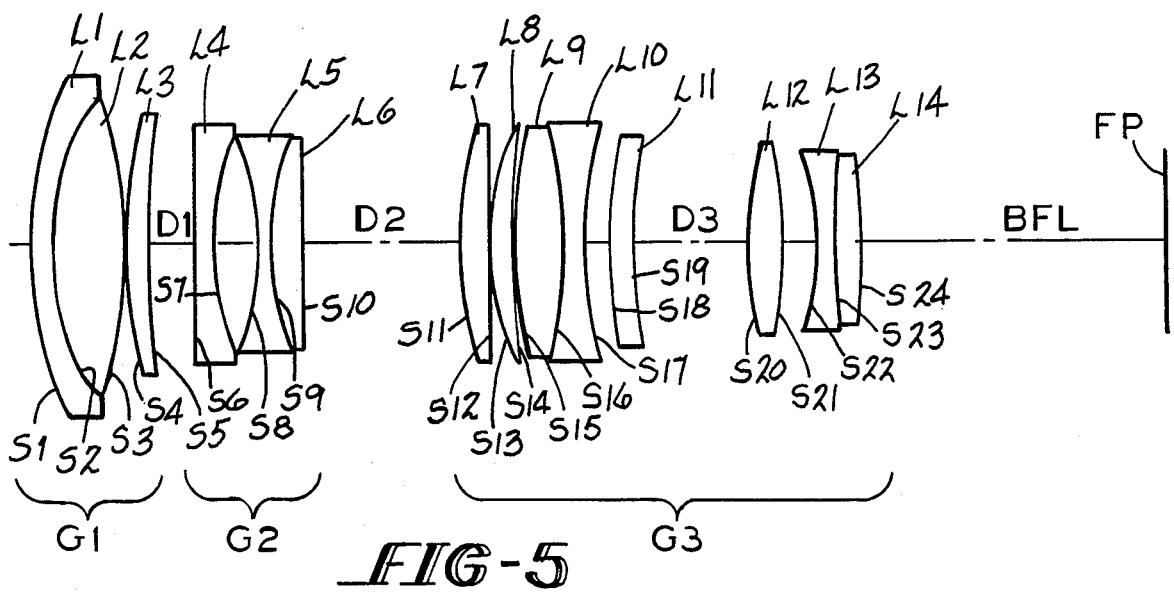

Table V defines a lens embodying the invention as shown in FIG. 5:

TABLE V

| LENS | | SURFACE RADII (mm) | AXIAL DISTANCE BETWEEN SURFACES (mm) | $N_D$ | $V_D$ |
|---|---|---|---|---|---|
| L1 | S1 | 54.948 | | | |
|   | S2 | 34.0161 | 3.000 | 1.805 | 25.5 |
| L2 | S2 | −170.280 | 12.200 | 1.654 | 60.8 |
|   | S4 | 66.202 | .100 | | |
| L3 | S5 | 177.569 | 4.000 | 1.669 | 44.9 |
|   | S6 | 53285.281 | D1 | | |
| L4 | S7 | 37.063 | 2.000 | | |
|   | S8 | −45.053 | 6.611 | | |
| L5 | S9 | 33.594 | 2.000 | 1.697 | 55.5 |
| L6 | S10 | 359.1997 | 6.00 | 1.805 | 25.5 |
|   | S11 | 80.455 | D2 | | |
| L7 | S12 | −2985.481 | 4.000 | 1.720 | 50.3 |
|   | S13 | 45.138 | .100 | | |
| L8 | L14 | 324.248 | 4.000 | 1.640 | 60.2 |
|   | S15 | 120.439 | .100 | | |
| L9 | S16 | −76.160 | 7.400 | 1.487 | 70.4 |
| L10 | S17 | 105.400 | 1.800 | 1.785 | 26.1 |
|   | S18 | 155.381 | 3.543 | | |
| L11 | S19 | 165.446 | 4.00 | 1.785 | 25.7 |
|   | S20 | 64.585 | 21.695 | | |
| L12 | S21 | −42.160 | 4.800 | 1.487 | 70.4 |
|   | S22 | −27.547 | 5.771 | | |
| L13 | S23 | 182.230 | 1.800 | | |
| L14 | S24 | −135.578 | 3.500 | 1.785 | 25.7 |

Aperture stop 11.02 mm after surface S19
Relative Aperture = f/3.50–4.60
EFL 77.86–197.80

| ZOOM SPACING DATA | | | |
|---|---|---|---|
| EFL | D1 | D2 | BFL |
| 77.86 mm | 1.16 mm | 70.52 mm | 56.44 mm |
| 135.14 | 5.28 | 26.64 | 76.44 |
| 197.80 | 8.31 | 10.04 | 89.97 |

Table VI defines a lens embodying the invention as shown in FIG. 6:

TABLE VI

| LENS | | SURFACE RADII (mm) | AXIAL DISTANCE BETWEEN SURFACES (mm) | $N_D$ | $V_D$ |
|---|---|---|---|---|---|
| L1 | S1 | 57.608 | | | |
|   | S2 | 39.733 | 3.000 | 1.805 | 2.55 |
| L2 | S3 | −191.098 | 11.700 | 1.487 | 70.4 |
|   | S4 | 64.318 | .100 | | |
| L3 | S5 | 361.085 | 4.600 | 1.487 | 70.4 |

TABLE VI-continued

| LENS | | SURFACE RADII | D1 / AXIAL DISTANCE BETWEEN SURFACES | $N_D$ | $V_D$ |
|---|---|---|---|---|---|
| L4 | S6 | −477.713 | | | |
|  | S7 | −135.642 | 2.500 | 1.785 | 26.1 |
| L5 | S8 | 38.56 | 1.800 | | |
|  | S9 | −42.385 | 5.900 | | |
| L6 | S10 | 38.063 | 2.000 | 1.640 | 60.2 |
| L7 | S11 | 351.153 | 5.300 | 1.785 | 25.7 |
|  | | | D2 | | |
| L8 | S12 | 124.387 | 3.900 | 1.487 | 70.4 |
|  | S13 | −142.452 | .100 | | |
| L9 | S14 | 68.977 | 3.900 | 1.487 | 70.4 |
|  | S15 | PLANO | .100 | | |
| L10 | S16 | 53.977 | 8.300 | 1.487 | 70.4 |
|  | S17 | −50.419 | 1.800 | 1.785 | 26.1 |
| L11 | S18 | −3696.262 | 19.386 | | |
| L12 | S19 | 388.069 | 12.932 | 1.648 | 33.8 |
|  | S20 | −61.324 | 18.143 | | |
| L13 | S21 | −26.200 | 1.500 | 1.806 | 40.7 |
|  | S22 | −63.333 | | | |

Aperture stop 17.96 mm after S18
Relative Aperture f/2.9–f/4.1
EFL 73.7 mm–197.4 mm

ZOOM SPACING DATA

| EFL | D1 | D2 | BFL |
|---|---|---|---|
| 73.70 mm | 4.17 mm | 36.92 mm | 39.01 mm |
| 133.61 | — | 11.92 | 15.79 | 51.69 |
| 197.44 | 15.42 | .50 | 63.19 |

Figure 7:
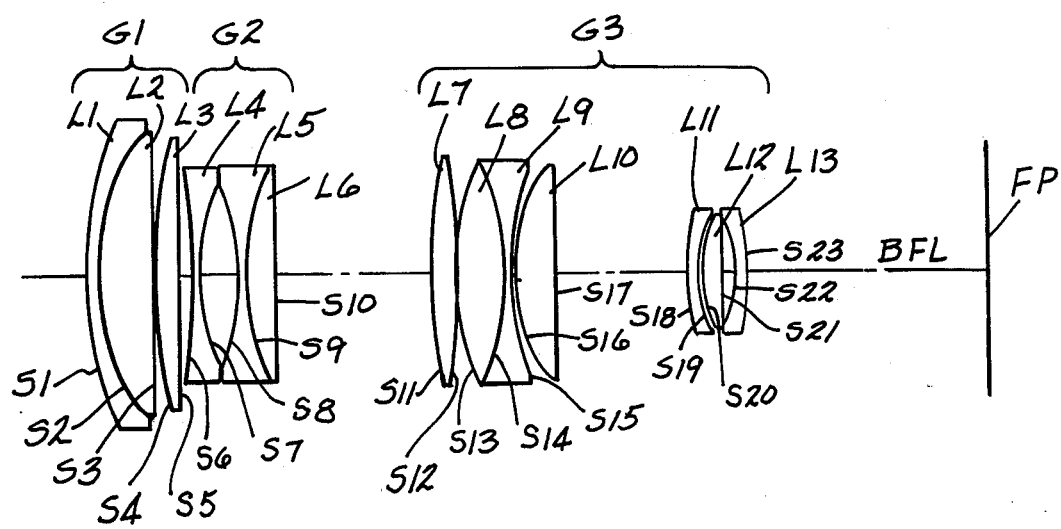

Table VII defines a lens embodying the invention as shown in FIG. 7:

TABLE VII

| LENS | | SURFACE RADII (mm) | AXIAL DISTANCE BETWEEN SURFACES (mm) | $N_D$ | $V_D$ |
|---|---|---|---|---|---|
| L1 | S1 | 60.260 | 2.000 | 1.805 | 25.5 |
| L2 | S2 | 35.650 | 9.589 | 1.607 | 56.7 |
|  | S3 | −700.208 | .200 | | |
| L3 | S4 | 91.232 | 3.792 | 1.603 | 60.7 |
|  | S5 | 1841.514 | Z1 | | |
| L4 | S6 | −151.106 | 1.500 | 1.806 | 40.7 |
|  | S7 | 32.611 | 6.202 | | |
| L5 | S8 | −45.164 | 1.500 | 1.487 | 70.4 |
|  | S9 | 37.878 | 4.873 | 1.847 | 23.83 |
| L6 | S10 | 370.653 | Z2 | | |
| L7 | S11 | 79.526 | 4.002 | 1.785 | 25.7 |
|  | S12 | −241.015 | .200 | | |
| L8 | S13 | 45.118 | 8.012 | 1.564 | 60.8 |
|  | S14 | −44.880 | 1.500 | 1.805 | 25.5 |
| L9 | S15 | 51.885 | | | |
|  | S16 | 28.552 | .200 | | |
| L10 | S17 | 410.023 | 6.422 | 1.623 | 58.1 |
|  | | | 22.391 | | |
| L11 | S18 | 44.912 | 1.500 | 1.834 | 37.3 |
|  | S19 | 18.917 | .419 | | |
| L12 | S20 | 18.705 | 3.949 | 1.617 | 36.61 |
|  | S21 | −145.878 | 1.989 | | |
| L13 | S22 | −19.411 | 1.500 | 1.678 | 53.4 |
|  | S23 | −55.447 | | | |

Aperture stop 7.940 mm after Surface S17

ZOOM SPACING DATA

| f/ | EFL | Z1 | Z2 | BFL |
|---|---|---|---|---|
| 2.9 | 70.57 mm | 2.00 mm | 25.77 mm | 40.49 mm |
| 3.1 | 85.00 | 5.35 | 19.67 | 43.34 |
| 3.3 | 105.00 | 8.18 | 12.43 | 47.65 |
| 3.6 | 145.00 | 11.88 | 1.00 | 55.38 |

Figure 8:
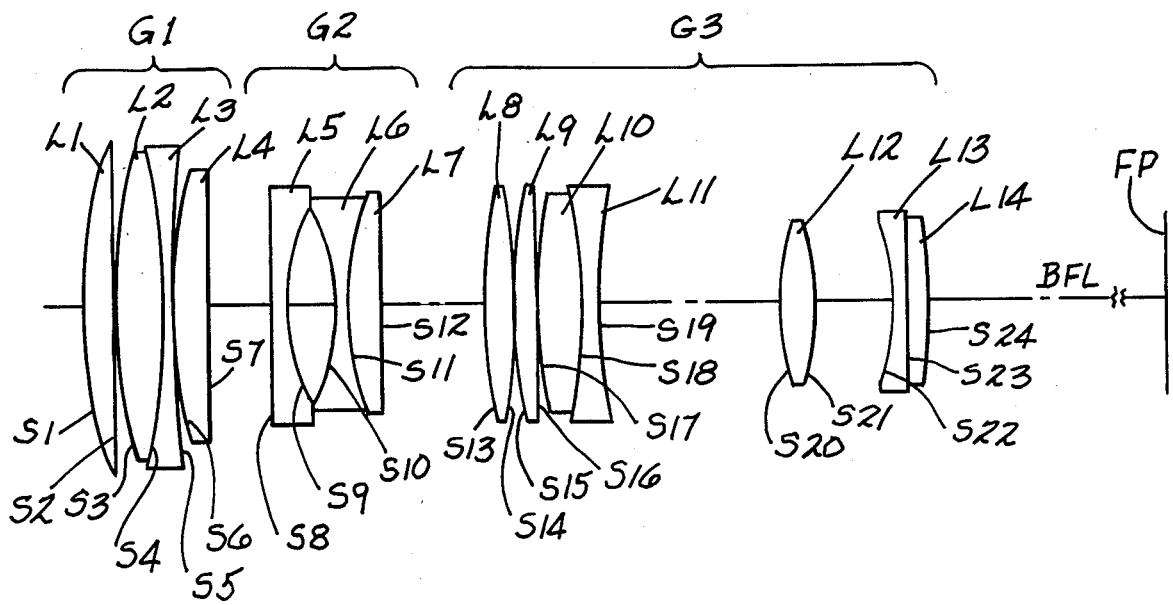

Table VIII defines a lens embodying the invention as shown in FIG. 8:

TABLE VIII

| LENS | | SURFACE RADII (mm) | AXIAL DISTANCE BETWEEN SURFACES (mm) | $N_D$ | $V_D$ |
|---|---|---|---|---|---|
| L1 | S1 | 85.153 | 4.500 | 1.517 | 64.2 |
|  | S2 | 577.955 | .100 | | |
| L2 | S3 | 77.955 | 9.500 | 1.589 | 61.3 |
|  | S4 | −186.300 | | | |
| L3 | | | 2.700 | 1.805 | 25.5 |
|  | S5 | 293.223 | .100 | | |
| L4 | S6 | 91.444 | 5.500 | 1.517 | 64.2 |
|  | S7 | −1705.019 | Z1 | | |
| L5 | S8 | −2183.251 | 2.000 | 1.773 | 49.6 |
|  | S9 | 35.305 | 6.795 | | |
| L6 | S10 | −47.951 | 2.000 | 1.697 | 55.5 |
| L7 | S11 | 36.239 | 6.000 | 1.805 | 25.5 |
|  | S12 | 348.673 | Z2 | | |
| L8 | S13 | 75.843 | 4.000 | 1.770 | 46.8 |
|  | S14 | −399.249 | .100 | | |
| L9 | S15 | 51.469 | 4.000 | 1.653 | 58.9 |
|  | S16 | 322.350 | .100 | | |
| L10 | S17 | 77.230 | 7.400 | 1.487 | 70.4 |
|  | S18 | −81.272 | | | |
| L11 | S19 | 81.349 | 1.800 | 1.785 | 26.1 |
|  | | | 29.293 | | |
| L12 | S20 | 46.199 | 4.800 | 1.497 | 68.6 |
|  | S21 | −83.668 | 9.333 | | |
| L13 | S22 | −31.364 | 1.800 | 1.773 | 49.6 |
|  | S23 | 551.639 | | | |
| L14 | S24 | −113.624 | 3.500 | 1.785 | 25.7 |

TABLE VIII-continued

Aperture stop 8.264 mm after Surface S20.

ZOOM SPACING DATA

| f/ | EFL | Z1 | Z2 | BFL |
|---|---|---|---|---|
| 2.86 | 72.48 mm | 4.14 mm | 38.99 mm | 39.07 mm |
| 3.67 | 134.93 | 10.64 | 16.259 | 55.28 |
| 4.14 | 202.43 | 14.26 | .85 | 67.09 |

Table IX sets forth the EFL's of each group of the lenses of Tables I–VII, where $F_1$ is the EFL of a group G1, $F_2$ is the EFL of group G2, and $F_3$ is the EFL of group G3.

TABLE IX

| TABLE | $F_1$ | $F_2$ | $F_3$ | $F_1/F_3$ | $|F_1/F_2|$ |
|---|---|---|---|---|---|
| I | 69.4 | −28.3 | 44.3 | 1.57 | 2.45 |
| II | 69.4 | −30.2 | 48.1 | 1.44 | 2.29 |
| III | 69.4 | −28.6 | 50.4 | 1.38 | 2.42 |
| IV | 69.4 | −26.8 | 43.3 | 1.60 | 2.59 |
| V | 59.5 | −26.5 | 53.4 | 1.11 | 2.24 |
| VI | 69.5 | −26.9 | 42.2 | 1.65 | 2.58 |
| VII | 68.4 | −29.1 | 39.2 | 1.75 | 2.35 |
| VIII | 69.4 | −25.9 | 45.8 | 1.52 | 2.68 |

A lens embodying the invention may also be defined by the ratio of the optical powers of the individual groups to the geometric mean of the power of the lens.

The geometric mean ($K_M$) of the powers of each lens is $$K_M = \sqrt{K_S K_L}$$

where $K_S$ and $K_L$ are the optical powers of the lens expressed as the reciprocal of its equivalent focal length in millimeters at the shortest ($K_S$) and longest ($K_L$) EFL's, respectively.

In the examples hereinafter set forth, $K_M = 0.0080$ in the lens of Table V, $K_m = 0.0099$ in the lens of Table VII, and in all the other tables $K_M = 0.0083$.

Table X sets forth the ratio of the optical powers of each lens group of Tables I–VI to the geometric mean of the power of each lens.

TABLE X

| TABLE | $K_1/K_M$ | $K_2/K_M$ | $K_3/K_M$ |
|---|---|---|---|
| I | 1.73 | −4.27 | 2.72 |
| II | 1.73 | −3.99 | 2.512 |
| III | 1.73 | −4.33 | 2.39 |
| IV | 1.73 | −4.50 | 2.78 |
| V | 2.10 | −4.70 | 2.38 |
| VI | 1.73 | −4.48 | 2.86 |
| VII | 1.47 | −3.47 | 2.57 |
| VIII | 1.73 | −4.65 | 2.63 |

The invention provides a three group zoom lens having a zoom range of substantially 3:1 in the telephoto range with movement of only the second and third groups, which lens is compact and has a large relative aperture.

It may thus be seen that the objects of the invention are efficiently attained. While preferred embodiments of the invention have been set forth for purposes of disclosure, other embodiments and modifications of the disclosed embodiments may occur to others skilled in the art. Accordingly, the appended claims are intended to cover all embodiments of the invention which do not depart from the spirit and scope of the invention.

What is claimed is:

1. A zoom lens having a range of equivalent focal lengths in which the lowest equivalent focal length of the lens is greater than the diagonal of the image frame of the lens, said lens from the object end consisting of a first positive group, a second negative group and a third positive group, said first group having an optical power $K_1$, said second group having an absolute optical power $K_2$, said third group having an optical power $K_3$ and $$2.2 > K_1/K_M > 1.4$$

$$4.8 > |K_2/K_M| > 3.4$$

$$2.9 > K_3/K_M > 2.3$$

where $K_M$ is the geometric mean of the equivalent focal lengths of said lens, said first group being axially movable only for focusing and said second and third groups being movable in opposite directions to vary the equivalent focal length of said lens.

2. The lens of claim 1 wherein $$f_1 < f_3 < 1.85 \, f_1$$

where $f_1$ and $f_3$ are the equivalent focal lengths of said first and third groups.

3. The lens of claim 1 where $$2.0 < |f_1/f_2| < 2.85$$

where $f_1$ and $f_2$ are the equivalent focal lengths of said first and second groups.

4. A lens according to claim 1 scaled to an image frame of 24×36 mm defined substantially as follows:

| LENS | SURFACE RADII (mm) | AXIAL DISTANCE BETWEEN SURFACES (mm) | $N_D$ | $V_D$ |
|---|---|---|---|---|
| L1 | S1  57.79 | | | |
| | | 3.00 | 1.805 | 25.5 |
| | S2  36.55 | | | |
| L2 | | 12.20 | 1.564 | 60.8 |
| | S3  −203.97 | | | |
| | | .10 | | |
| | S4  73.11 | | | |
| L3 | | 4.00 | 1.658 | 50.9 |
| | S5  147.31 | | | |
| | | D1 | | |
| | S6  5646.19 | | | |
| L4 | | 2.00 | 1.773 | 49.6 |
| | S7  39.02 | | | |
| | | 6.20 | | |
| | S8  −44.79 | | | |
| L5 | | 2.00 | 1.713 | 53.9 |
| | S9  36.71 | | | |
| L6 | | 6.00 | 1.805 | 25.5 |
| | S10  1391.85 | | | |
| | | D2 | | |
| | S11  118.44 | | | |
| L7 | | 5.00 | 1.487 | 70.4 |
| | S12  −202.53 | | | |
| | | .10 | | |
| | S13  66.67 | | | |
| L8 | | 4.00 | 1.702 | 41.2 |
| | S14  228.83 | | | |
| | | .10 | | |
| | S15  45.89 | | | |
| L9 | | 8.00 | 1.487 | 70.4 |
| | S16  −73.04 | | | |
| L10 | | 1.50 | 1.785 | 26.1 |
| | S17  180.77 | | | |
| | | 23.51 | | |
| | S18  37.07 | | | |
| L11 | | 4.00 | 1.487 | 70.4 |
| | S19  73.88 | | | |
| | | 1.80 | 1.575 | 41.5 |
| L12 | S20  31.01 | | | |
| | | 1.20 | | |
| | S21  49.17 | | | |

-continued

| LENS | | SURFACE RADII (mm) | AXIAL DISTANCE BETWEEN SURFACES (mm) | $N_D$ | $V_D$ |
|---|---|---|---|---|---|
| L13 | | | 5.00 | 1.517 | 52.2 |
| | S22 | −58.36 | | | |
| | | | 11.66 | | |
| | S23 | −27.51 | | | |
| L14 | | | 7.80 | 1.773 | 49.6 |
| | S24 | 438.24 | | | |
| | | | .10 | | |
| | S25 | 120.08 | | | |
| L15 | | | 3.50 | 1.805 | 25.5 |
| | S26 | −377.00 | | | | where L1–L15 are lens elements from the object to the image end of the lens, S1–S26 are surface radii of the elements L1–L15, $N_D$ is the index of refraction of each of the lens elements specified, and $V_D$ is the dispersion of each lens element as measured by its Abbe number.

| ZOOM SPACING DATA | | | |
|---|---|---|---|
| EFL | D1 | D2 | BFL |
| 74.0 | 3.67 mm | 39.19 mm | 39.03 mm |
| 133.57 | 10.24 | 16.31 | 54.56 |
| 196.26 | 13.86 | .50 | 64.44 |

5. A lens according to claim 1 scaled to an image frame of 24×36 mm defined substantially as follows:

| LENS | | SURFACE RADII (mm) | AXIAL DISTANCE BETWEEN SURFACES(mm) | $N_D$ | $V_D$ |
|---|---|---|---|---|---|
| | S1 | 57.13 | | | |
| L1 | | | 3.00 | 1.805 | 25.5 |
| | S1 | −38.71 | | | |
| L2 | | | 11.00 | 1.511 | 60.5 |
| | S3 | −206.5 | | | |
| | | | .20 | | |
| | S4 | 66.63 | | | |
| L3 | | | 4.00 | 1.511 | 60.5 |
| | S5 | 236.48 | | | |
| | | | D1 | | |
| | S6 | −1808.22 | | | |
| L4 | | | 2.20 | 1.773 | 49.5 |
| | S7 | 42.9 | | | |
| | | | 7.00 | | |
| | S8 | −53.64 | | | |
| L5 | | | 2.00 | 1.711 | 54.2 |
| | S9 | 38.31 | | | |
| L6 | | | 6.50 | 1.805 | 25.5 |
| | S10 | 380.11 | | | |
| | | | D2 | | |
| | S11 | 117.93 | | | |
| L7 | | | 4.50 | 1.665 | 59.0 |
| | S12 | −174.33 | | | |
| | | | .10 | | |
| | S13 | 42.80 | | | |
| L8 | | | 4.50 | 1.602 | 54.0 |
| | S14 | 775.73 | | | |
| | | | .10 | | |
| | S15 | 114.46 | | | |
| L9 | | | 4.50 | 1.809 | 46.4 |
| | S16 | 644.83 | | | |
| | | | .60 | | |
| | S17 | −2850.47 | | | |
| L10 | | | 5.00 | 1.481 | 71.6 |
| | S18 | −54.13 | | | |
| L11 | | | 1.50 | 1.785 | 26.1 |
| | S19 | 92.26 | | | |
| | | | 22.86 | | |
| | S20 | 260.57 | | | |
| L12 | | | 3.00 | 1.773 | 34.1 |
| | S21 | −56.45 | | | |
| | | | 11.59 | | |
| | S22 | −28.86 | | | |
| L13 | | | 1.50 | 1.789 | 41.4 |
| | S23 | 33.20 | | | |
| L14 | | | 4.80 | 1.487 | 70.4 |
| | S24 | −166.68 | | | |
| | | | .10 | | |
| | S25 | 53.96 | | | |
| L15 | | | 3.50 | 1.785 | 25.7 |
| | S26 | 231.05 | | | |

| ZOOM SPACING DATA | | | |
|---|---|---|---|
| EFL | D1 | D2 | BFL |
| 72.1 | 3.45 mm | 44.07 mm | 38.60 mm |
| 135.0 | 6.07 | 17.73 | 59.15 |
| 203.5 | 10.28 | .50 | 72.15 |

6. A lens according to claim 1 scaled to an image frame of 24×36 mm defined substantially as follows:

| LENS | | SURFACE RADII (mm) | AXIAL DISTANCE BETWEEN SURFACES(mm) | $N_D$ | $V_D$ |
|---|---|---|---|---|---|
| | S1 | 58.324 | | | |
| L1 | | | 3.000 | 1.785 | 26.1 |
| | S2 | 39.608 | | | |
| L2 | | | 12.000 | 1.487 | 70.4 |
| | S3 | −175.640 | | | |
| | | | .100 | | |
| | S4 | 61.445 | | | |
| L3 | | | 4.300 | 1.487 | 70.4 |
| | S5 | 258.513 | | | |
| | | | D1 | | |
| | S6 | −491.316 | | | |
| L4 | | | 3.400 | 1.834 | 37.3 |
| | S7 | −59.685 | | | |
| L5 | | | 1.800 | 1.773 | 49.6 |
| | S8 | 37.576 | | | |
| | | | 6.210 | | |
| | S9 | −40.656 | | | |
| L6 | | | 1.800 | 1.640 | 60.2 |
| | S10 | 41.069 | | | |
| L7 | | | 4.400 | 1.805 | 25.5 |
| | S11 | 364.418 | | | |
| | | | D2 | | |
| | S12 | 115.149 | | | |
| L8 | | | 3.800 | 1.487 | 70.4 |
| | S13 | −135.833 | | | |
| | | | .100 | | |
| | S14 | 63.229 | | | |
| L9 | | | 3.600 | 1.589 | 61.3 |
| | S15 | 222.510 | | | |
| | | | .100 | | |
| | S16 | 47.681 | | | |
| L10 | | | 7.700 | 1.487 | 70.4 |
| | S17 | −59.094 | | | |
| L11 | | | 2.200 | 1.805 | 25.5 |
| | S18 | 981.386 | | | |
| | | | 25.958 | | |
| | S19 | 251.278 | | | |
| L12 | | | 4.100 | 1.603 | 38.0 |
| | S20 | −57.139 | | | |
| | | | 14.178 | | |
| | S21 | −25.510 | | | |
| L13 | | | 2.200 | 1.834 | 37.3 |
| | S22 | −120.287 | | | |
| | | | .200 | | |
| | S23 | 321.054 | | | |
| L14 | | | 2.400 | 1.762 | 26.6 |
| | S24 | −160.611 | | | | where L1–L14 are lens elements from the object to the image end of the lens, S1–S22 are surface radii of the elements L1–L14, $N_D$ is the index of refraction of each of the lens elements specified, and $V_D$ is the dispersion of each lens element as measured by its Abbe number.

| ZOOM SPACING DATA | | | | |
|---|---|---|---|---|
| f/NO. | EFL | D1 | D2 | BFL |
| 2.89 | 72.132 mm | 2.500 mm | 3.490 | 38.997 |
| 3.49 | 132.911 | 10.692 | 15.947 | 52.352 |
| 4.01 | 203.786 | 14.468 | .500 | 64.025 |

7. A lens according to claim 1 scaled to an image frame of 24×36 mm defined substantially as follows:

| LENS | | SURFACE RADII (mm) | AXIAL DISTANCE BETWEEN SURFACES(mm) | $N_D$ | $V_D$ |
|---|---|---|---|---|---|
| L1 | S1 | 54.948 | | | |
| | | | 3.000 | 1.805 | 25.5 |
| L2 | S2 | 34.0161 | | | |
| | | | 12.200 | 1.654 | 60.8 |
| | S2 | −170.280 | | | |
| | | | .100 | | |
| L3 | S4 | 66.202 | | | |
| | | | 4.000 | 1.669 | 44.9 |
| | S5 | 177.569 | | | |
| | | | D1 | | |
| L4 | S6 | 53285.281 | | | |
| | | | 2.000 | | |
| | S7 | 37.063 | | | |
| | | | 6.611 | | |
| L5 | S8 | −45.053 | | | |
| | | | 2.000 | 1.697 | 55.5 |
| | S9 | 33.594 | | | |
| L6 | | | 6.00 | 1.805 | 25.5 |
| | S10 | 359.1997 | | | |
| | | | D2 | | |
| L7 | S11 | 80.455 | | | |
| | | | 4.000 | 1.720 | 50.3 |
| | S12 | −2985.481 | | | |
| | | | .100 | | |
| L8 | S13 | 45.138 | | | |
| | | | 4.000 | 1.640 | 60.2 |
| | L14 | 324.248 | | | |
| | | | .100 | | |
| L9 | S15 | 120.439 | | | |
| | | | 7.400 | 1.487 | 70.4 |
| | S16 | −76.160 | | | |
| L10 | | | 1.800 | 1.785 | 26.1 |
| | S17 | 105.400 | | | |
| | | | 3.543 | | |
| L11 | S18 | 155.381 | | | |
| | | | 4.00 | 1.785 | 25.7 |
| | S19 | 165.446 | | | |
| | | | 21.695 | | |
| L12 | S20 | 64.585 | | | |
| | | | 4.800 | 1.487 | 70.4 |
| | S21 | −42.160 | | | |
| | | | 5.771 | | |
| L13 | S22 | −27.547 | | | |
| | | | 1.800 | | |
| L14 | S23 | 182.230 | | | |
| | | | 3.500 | 1.785 | 25.7 |
| | S24 | −135.578 | | | | where L1–L14 are lens elements from the object to the image end of the lens, S1–S24 are surface radii of the elements L2–L14, $N_D$ is the index of refraction of each of the lens elements as specified, and $V_D$ is the dispersion of each lens element as measured by its Abbe number.

| ZOOM SPACING DATA | | | |
|---|---|---|---|
| EFL | D1 | D2 | BFL |
| 77.86 mm | 1.16 mm | 70.52 mm | 56.44 mm |
| 135.14 | 5.28 | 26.64 | 76.44 |
| 197.80 | 8.31 | 10.04 | 89.97 |

8. A lens according to claim 1 scaled to an image frame of 24×36 mm defined substantially as follows:

| LENS | | SURFACE RADII(mm) | AXIAL DISTANCE BETWEEN SURFACES(mm) | $N_D$ | $V_D$ |
|---|---|---|---|---|---|
| L1 | S1 | 57.608 | | | |
| | | | 3.000 | 1.805 | 2.55 |
| | S2 | 39.733 | | | |
| L2 | | | 11.700 | 1.487 | 70.4 |
| | S3 | −191.098 | | | |
| | | | .100 | | |
| L3 | S4 | 64.318 | | | |
| | | | 4.600 | 1.487 | 70.4 |
| | S5 | 361.085 | | | |
| | | | Z1 | | |
| L4 | S6 | −477.713 | | | |
| | | | 2.500 | 1.785 | 26.1 |
| | S7 | 0135.642 | | | |
| L5 | | | 1.800 | 1.773 | 49.6 |
| | S8 | 38.56 | | | |
| | | | 5.900 | | |
| L6 | S9 | −42.385 | | | |
| | | | 2.000 | 1.640 | 60.2 |
| | S10 | 38.063 | | | |
| L7 | | | 5.300 | 1.785 | 25.7 |
| | S11 | 351.153 | | | |
| | | | Z2 | | |
| L8 | S12 | 124.387 | | | |
| | | | 3.900 | 1.487 | 70.4 |
| | S13 | −142.452 | | | |
| | | | .100 | | |
| | S14 | 68.977 | | | |
| L9 | | | 3.900 | 1.487 | 70.4 |
| | S15 | PLANO | | | |
| | | | .100 | | |
| | S16 | 53.977 | | | |
| L10 | | | 8.300 | 1.487 | 70.4 |
| | S17 | −50.419 | | | |
| L11 | | | 1.800 | 1.785 | 26.1 |
| | S18 | −3696.262 | | | |
| | | | 18.386 | | |
| | S19 | −61.324 | | | |
| L12 | | | 12.932 | 1.648 | 33.8 |
| | S20 | | | | |
| | | | 18.143 | | |
| | S21 | −26.200 | | | |
| L13 | | | 1.500 | 1.806 | 40.7 |
| | S22 | −63.333 | | | | where L1–L13 are lens elements from the object to the image end of the lens, S1–S22 are surface radii of the elements L1–L13, $N_D$ is the index of refraction of each of the lens elements as specified, and $V_D$ is the dispersion of each lens element as measured by its Abbe number.

| ZOOM SPACING DATA | | | |
|---|---|---|---|
| EFL | D1 | D2 | BFL |
| 73.70 mm | 4.17 mm | 36.92 mm | 39.01 mm |
| 133.61 | 11.92 | 15.79 | 51.69 |
| 197.44 | 15.42 | .50 | 63.19 |

9. A lens according to claim 1 scaled to an image frame of 24×36 mm defined substantially as follows:

| LENS | | SURFACE RADII (mm) | AXIAL DISTANCE BETWEEN SURFACES (mm) | $N_D$ | $V_D$ |
|---|---|---|---|---|---|
| L1 | S1 | 60.260 | | | |
| | | | 2.000 | 1.805 | 25.4 |
| | S2 | 35.650 | | | |
| L2 | | | 9.589 | 1.607 | 56.7 |
| | S3 | 700.208 | | | |
| | | | .200 | | |

-continued

| LENS | | SURFACE RADII (mm) | AXIAL DISTANCE BETWEEN SURFACES (mm) | $N_D$ | $V_D$ |
|---|---|---|---|---|---|
| L3 | S4 | 91.232 | | | |
|  |  |  | 3.792 | 1.603 | 60.7 |
|  | S5 | 1841.514 | | | |
|  |  |  | Z1 | | |
| L4 | S6 | −151.106 | | | |
|  |  |  | 1.500 | 1.806 | 40.7 |
|  | S7 | 32.611 | | | |
|  |  |  | 6.202 | | |
| L5 | S8 | −45.164 | | | |
|  |  |  | 1.500 | 1.487 | 70.4 |
|  | S9 | 37.878 | | | |
| L6 |  |  | 4.873 | 1.847 | 23.83 |
|  | S10 | 370.653 | | | |
|  |  |  | Z2 | | |
| L7 | S11 | 79.526 | | | |
|  |  |  | 4.002 | 1.785 | 25.7 |
|  | S12 | −241.015 | | | |
|  |  |  | .200 | | |
| L8 | S13 | 45.118 | | | |
|  |  |  | 8.012 | 1.564 | 60.8 |
|  | S14 | −44.880 | | | |
| L9 |  |  | 1.500 | 1.805 | 25.5 |
|  | S15 | 51.885 | | | |
|  |  |  | .200 | | |
| L10 | S16 | 28.552 | | | |
|  |  |  | 6.422 | 1.623 | 58.1 |
|  | S17 | 410.023 | | | |
|  |  |  | 22.391 | | |
| L11 | S18 | 44.912 | | | |
|  |  |  | 1.500 | 1.834 | 37.3 |
|  | S19 | 18.917 | | | |
|  |  |  | .419 | | |
| L12 | S20 | 18.705 | | | |
|  |  |  | 3.949 | 1.617 | 36.61 |
|  | S21 | −145.878 | | | |
|  |  |  | 1.989 | | |
| L13 | S22 | −19.411 | | | |
|  |  |  | 1.500 | 1.678 | 53.4 |
|  | S23 | −55.447 | | | | where L1–L13 are lens elements from the object to the image end of the lens, S1–S23 are surface radii of the elements L1–L13, $N_D$ is the index of refraction of each of the elns elements as specified, and $V_D$ is the dispersion of each lens element as measured by its Abbe number.

| ZOOM SPACING DATA | | | | |
|---|---|---|---|---|
| f/ | EFL | Z1 | Z2 | BFL |
| 2.9 | 70.57 mm | 2.00 mm | 25.77 mm | 40.49 mm |
| 3.1 | 85.00 | 5.352 | 19.67 | 43.34 |
| 3.3 | 105.00 | 8.183 | 12.431 | 47.65 |
| 3.6 | 145.00 | 11.880 | 1.000 | 55.38 |

10. A lens according to claim 1 scaled to an image frame of 24×36 mm defined substantially as follows:

| LENS | | SURFACE RADII (mm) | AXIAL DISTANCE BETWEEN SURFACES (mm) | $N_D$ | $V_D$ |
|---|---|---|---|---|---|
| L1 | SI | 85.153 | | | |
|  |  |  | 4.500 | 1.517 | 64.2 |
|  | L2 | 577.955 | | | |
|  |  |  | 1.000 | | |
| L2 | S3 | 77.955 | | | |
|  |  |  | 9.500 | 1.589 | 61.3 |
|  | S4 | −L86.300 | | | |
| L3 |  |  | 2.700 | 1.805 | 25.5 |
|  | S5 | 293.223 | | | |
|  |  |  | .100 | | |
|  | S6 | 91.444 | | | |
| L4 |  |  | 5.500 | 1.517 | 64.2 |
|  | S7 | −1705.019 | | | |
|  |  |  | Z1 | | |
|  | S8 | −2183.251 | | | |
| L5 |  |  | 2.000 | 1.773 | 49.6 |
|  | S9 | 35.305 | | | |
|  |  |  | 6.795 | | |
|  | S10 | −47.951 | | | |
| L6 |  |  | 2.000 | 1.697 | 55.5 |
|  | S11 | 36.240 | | | |
| L7 |  |  | 6.000 | 1.805 | 25.5 |
|  | S12 | 348.673 | | | |
|  |  |  | Z2 | | |
|  | S13 | 75.843 | | | |
| L8 |  |  | 4.000 | 1.770 | 46.8 |
|  | S14 | −399.249 | | | |
|  |  |  | .100 | | |
|  | S15 | 51.469 | | | |
| L9 |  |  | 4.000 | 1.653 | 58.9 |
|  | S16 | 322.350 | | | |
|  |  |  | .100 | | |
|  | S17 | 77.230 | | | |
| L10 |  |  | 7.400 | 1.487 | 70.4 |
|  | S18 | −81.272 | | | |
| L11 |  |  | 1.800 | 1.785 | 26.1 |
|  | S19 | 81.239 | | | |
|  |  |  | 29.293 | | |
|  | S20 | 46.199 | | | |
| L12 |  |  | 4.800 | 1.497 | 68.6 |
|  | S21 | −83.668 | | | |
|  |  |  | 9.333 | | |
|  | S22 | −31.364 | | | |
| L13 |  |  | 1.800 | 1.773 | 49.6 |
|  | S23 | 551.639 | | | |
| L14 |  |  | 3.500 | 1.785 | 25.7 |
|  | S24 | −113.624 | | | |

| ZOOM SPACING DATA | | | | |
|---|---|---|---|---|
| f/ | EFL | Z1 | Z2 | BFL |
| 2.86 | 72.48 mm | 4.14 mm | 38.99 mm | 39.07 mm |
| 3.67 | 134.93 | 10.64 | 16.25 | 55.28 |
| 4.14 | 202.43 | 14.26 | .85 | 67.09 |

11. A lens according to claim 1 having at least one aspheric surface defined by the equation $$X = \frac{Cy^2}{1 + \sqrt{1 - (1 + K) C^2 y^2}} + Dy^4 + Ey^6 + Fy^8 + Gy^{10}$$

where X is the surface at a semi-aperture distance y from the optical axis of the lens, C is the curvature of the surface at the optical axis equal to the reciprocal of the radius, K is a conic constant or other surface of revolution, and D, E, F, and G are constants.

12. A lens according to claim 11 scaled to an image frame of 24×36 mm defined substantially as follows:

| LENS | | SURFACE RADII (mm) | AXIAL DISTANCE BETWEEN SURFACES (mm) | $N_D$ | $V_D$ |
|---|---|---|---|---|---|
| L1 | S1 | 64.12 | | | |
|  |  |  | 3.00 | 1.805 | 25.5 |
|  | S2 | 41.91 | | | |
| L2 |  |  | 8.20 | 1.500 | 67.1 |
|  | S3 | −257.89 | | | |
|  |  |  | .20 | | |
|  | S4 | 69.28 | | | |
| L3 |  |  | 4.00 | 1.492 | 68.4 |
|  | S5 | −1014.42 | | | |
|  |  |  | D1 | | |
|  | S6 | −368.70 | | | |
| L4 |  |  | 3.00 | 1.773 | 49.6 |
|  | S7 | 42.37 | | | |
|  |  |  | 4.64 | | |
|  | S8 | −43.61 | | | |

-continued

| LENS | | SURFACE RADII (mm) | AXIAL DISTANCE BETWEEN SURFACES (mm) | $N_D$ | $V_D$ |
|---|---|---|---|---|---|
| L5 | | | 2.50 | 1.660 | 58.6 |
| | S9 | 39.90 | | | |
| L6 | | | 4.00 | 1.805 | 25.5 |
| | S10 | 421.14 | | | |
| | | | D2 | | |
| | S11 | 90.55 | | | |
| L7 | | | 4.50 | 1.569 | 66.3 |
| | S12 | −220.96 | | | |
| | | | .10 | | |
| | S13 | 67.11 | | | |
| L8 | | | 4.50 | 1.635 | 58.4 |
| | S14 | 550.02 | | | |
| | | | .32 | | |
| | S15 | 55.37 | | | |
| L9 | | | 6.00 | 1.487 | 70.4 |
| | S16 | −83.00 | | | |
| L10 | | | 1.50 | 1.780 | 26.2 |
| | S17 | 626.54 | | | |
| | | | 11.14 | | |
| | S18 | 31.70 | | | |
| L11 | | | 4.42 | 1.834 | 37.3 |
| | S19 | 23.41 | | | |

-continued

| LENS | | SURFACE RADII (mm) | AXIAL DISTANCE BETWEEN SURFACES (mm) | $N_D$ | $V_D$ |
|---|---|---|---|---|---|
| | | | 23.41 | | |
| L12 | S20 | 30.82 | | | |
| | | | 3.50 | 1.491 | 58.3 |
| | S21 | 34.79 | | | | where L1–L12 are lens elements from the object to the image end of the lens, S1–S21 are surface radii of the elements L1–L12, $N_D$ is the index of refraction of each of the lens elements specified, and $V_D$ is the dispersion of each lens element as measured by its Abbe number.

| ZOOM SPACING DATA | | | |
|---|---|---|---|
| EFL | D1 | D2 | BFL |
| 72.1 mm | 2.26 mm | 4.17 mm | 52.38 mm |
| 135.0 | 11.68 | 17.62 | 66.49 |
| 203.5 | 15.76 | .50 | 79.55 |

| Aspheric Surface S21 |
|---|
| K = −.010 |
| D = .318 z $10^{-5}$ |
| E = −.587 × $10^{-8}$ |
| F = .398 z $10^{-10}$ |
| G = −.962 × $10^{-13}$ |

* * * * *

UNITED STATES PATENT AND TRADEMARK OFFICE
CERTIFICATE OF CORRECTION

PATENT NO. : 4,758,073
DATED : July 19, 1988
INVENTOR(S) : JACOB MOSKOVICH

It is certified that error appears in the above-identified patent and that said Letters Patent is hereby corrected as shown below:

Column 3, line 37, change "amounmt" to --amount--.

Column 3, line 43, change "$1.0F_1 < F_3 < 1.85F_1$" to --$F_3 < F_1 < 1.85F_3$--.

Column 11, line 36, change "$K_m = 0.0099$" to --$K_M = .0099$--.

Column 12, Claim 2, line 19, "$f_1 < f_3 < 1.85f_1$" should be --$F_3 < F_1 < 1.85F_3$--.

Column 12, Claim 3, line 25, "$f_1/f_2$" should be --$F_1/F_2$--.

Column 13, Claim 4, line 9, under heading "Axial Distances", opposite "L14", "?.80" should be --1.80--.

Signed and Sealed this

Fifteenth Day of August, 1989

*Attest:*

DONALD J. QUIGG

*Attesting Officer*        *Commissioner of Patents and Trademarks*